Figure 1:
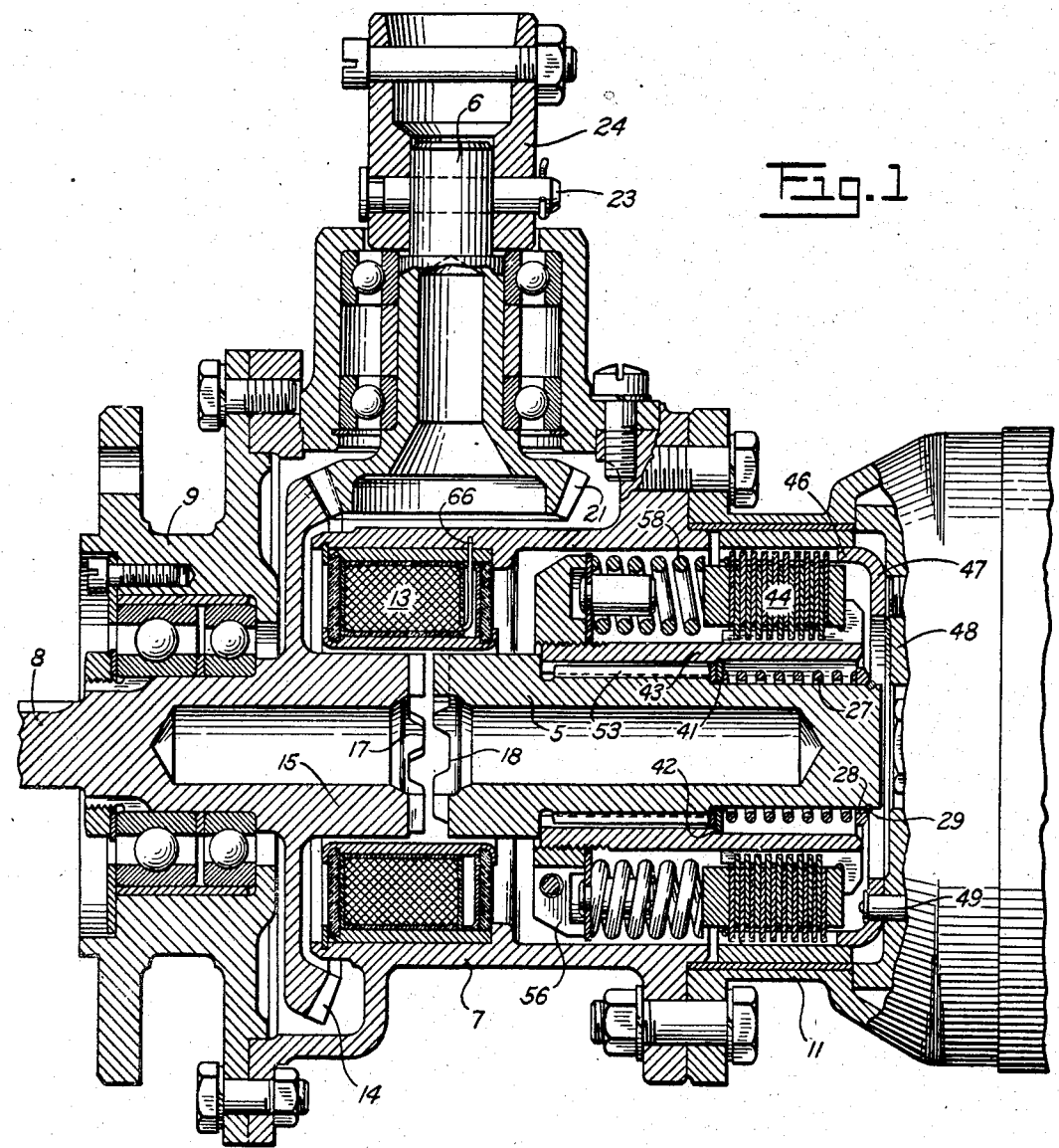

May 26, 1942. J. W. ALLEN 2,284,353
DRIVING MECHANISM
Original Filed Nov. 16, 1935

INVENTOR.
Joseph W. Allen
BY Martin J. Finnegan
ATTORNEY.

Patented May 26, 1942

2,284,353

UNITED STATES PATENT OFFICE 2,284,353

DRIVING MECHANISM

Joseph W. Allen, East Orange, N. J., assignor to Eclipse Aviation Corporation, East Orange, N. J., a corporation of New Jersey Original application November 16, 1935, Serial No. 50,229. Divided and this application December 16, 1939, Serial No. 309,672

1 Claim. (Cl. 192—.02)

This invention relates to clutch mechanism, and particularly to driving mechanism of a selective engagement character, wherein the transmission of torque may occur through one or the other of a plurality of sets of driving elements, depending upon whether or not a predetermined one of said sets is in the driving position.

An object of the invention is to provide a novel construction and method of operation of such a driving mechanism.

A second major object is to combine with such a driving mechanism and additional yieldable clutch means enabling the motor to overrun the driven element as soon as the latter reaches the limit of its travel. This is of special importance in the actuation of aircraft landing gear, the improvement of which constitutes a third major object of the invention.

These and other objects will become apparent from inspection of the following specification when read with reference to the accompanying drawing wherein is illustrated the preferred embodiment of the invention. It is to be expressly understood, however, that the drawing is for the purpose of illustration only, and is not designed as a definition of the limits of the invention, reference being had to the appended claim for this purpose.

Figure 2:
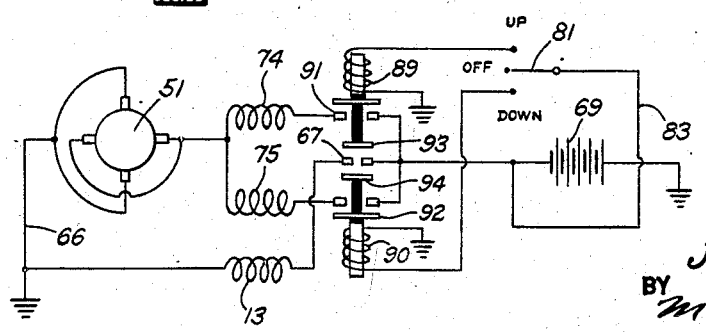

In the drawing:

Fig. 1 is a longitudinal sectional view of a device embodying the invention; and Fig. 2 is a schematic diagram of the electrical connections.

In the drawing reference characters 5 and 6 designate driving shafts mounted at right angles to one another in a common housing 7, the latter being capable of actuating the driven shaft 8 at all times while the former is capable of actuating said shaft 8 under certain conditions to be described. The shaft 8 is shown as journaled in an extension 9 of the housing 7, a similar extension 11 being provided as a means of housing a motor or other actuating means for the shaft 5.

The elements involved in the dual driving means for the driven shaft 8 include a solenoid 13 and a bevel gear 14 herein shown as integral with the enlarged and centrally bored end 15 of the driven shaft 8 and so located with respect to the driving shafts 5 and 6 that it is capable of receiving rotation from either of said shafts, although the shaft 5 is normally withdrawn from operative relation to the shaft 8 in that it normally occupies the position indicated in Fig. 1, in which position the clutch teeth 17 which are formed upon the hollow end of the shaft 15 (8) are beyond the reach of the correspondingly shaped teeth 18 on the correspondingly bored end of the shaft 5. The teeth of bevel gear 14, on the other hand, are fully meshed at all times with those of the correspondingly shaped bevel pinion 21 which is shown herein as being an integral extension of the driving shaft 6, the outer end of which shaft is provided with a pin 23 or other suitable means serving for attachment of a sleeve 24 or other manually operable instrumentality.

A coiled compression spring 27 constantly bears against a collar 28 held fast to the inner end of shaft 5 by suitable means 29, whereby the said spring 27 constantly exerts a thrust upon the shaft 5 tending to hold the teeth 18 out of mesh with the teeth 17 as shown. Spring 27 therefore opposes the pull of the solenoid 13, although only yieldingly, for the passage of current through the windings 13 is effective to move the magnetizable core constituted by the hollow shaft 5. Such movement results in a meshing of the teeth 18 with the teeth 17, thereby establishing driving relationship between the shafts 5 and 8. The left-hand end of the spring 27 rests against a collar or disc 41 which engages the shoulder 42 of the relatively stationary sleeve 43 constituting the inner race of a friction disc clutch 44 consisting of a plurality of inter-leaving friction plates splined alternately to the sleeve 43 and to a second sleeve or shell 46 having an inwardly turned rim 47 secured to a driving member 48 by suitable means such as that represented at 49, the said driving means 48 being a part integral with or operatively connected to the armature or rotor of the electric motor indicated diagrammatically at 51 in Fig. 2. Transmission of torque from the clutch elements 44 to the shaft 5 is provided for in the form of splines 53 on the shaft 5 engageable with corresponding splines on the inner surface of the sleeve 43, the outer surface thereof being threaded to receive a nut 56 which constitutes a means for adjusting the pressure of springs 58 and hence the torque transmitting capacity of the clutch 44. One end of the solenoid winding 13 is shown grounded to the frame of the motor at 66 in Fig. 1, and this ground connection is correspondingly designated in the diagram constituting Figure 2, the opposite end of the winding being indicated in Fig. 2 as connecting to one terminal post 67 of a switch in circuit with a battery 69 constituting the source of current for the electric motor 51. The latter is preferably provided with four brushes as indicated in Fig. 2 and separate windings 74 and 75 one of which is energized to produce clockwise rotation of the motor in one position of switch 81, and the other of which is energized to produce counterclockwise rotation of the motor in the opposite position of the switch, said switch being connected with the source 69 as indicated at 83. Preferably switch 81 is in a pilot circuit to relays 89 and 90 which in turn control switches 91 and 92, respectively, through which the main current for the motor is caused to flow, the flow of current to the solenoid 13 being brought about by either one or the other of the bridging elements 93 and 94, depending upon which of the solenoids 89 or 90 is energized. In other words, the energization of the motor 51 in either a clockwise or counterclockwise direction results in a concurrent energization of the solenoid 13 and hence in a closure of the clutch 17, 18. In the event, however, that it is desired to dispense with electrical operation, driven member 8 may be actuated manually or by other non-electrical means, acting through the shaft 6 and gear 21 to turn the gear 14 and hence the driven shaft 8. The shafts 5 and 8 disconnect as above indicated whereby the gear 14 is free to turn without interference from the stationary shaft 5. During motor actuation, however—that is when the shaft 5 is effective as the driving means for the shaft 8—the shaft 5 and the parts associated therewith will be turned by reason of the condition of permanent mesh as between the gears 14 and 21. This idle turning of the shaft 6, however, is not objectionable particularly, in view of the provision of the friction reducing bearings surrounding shaft 6, so that the latter does not constitute any appreciable drag upon the motor functioning.

It will be observed that the pre-set clutch 44 not only acts to protect the motor in the event of an overload but also enables the motor to overrun the shaft 8 as soon as the landing gear, or other "limited stroke" load, reaches the end of its travel, and even though the teeth 17 and 18 remain engaged (due to tardiness in the de-energization of coil 14 or for any other reason).

This application is a division of my application No. 50,229 filed November 16, 1935, now Patent No. 2,184,032, granted December 19, 1939.

What I claim is:

A landing gear drive including a motor, normally disengaged clutch and landing gear actuating shaft, manually operable means for causing energization of said motor at will, means shiftable to engage said clutch, a common source of energy for said motor and clutch engaging means, means for enabling said motor to overrun said clutch as soon as the landing gear actuating shaft encounters excessive resistance to further rotation, and manually operable means rotatable with said landing gear actuating shaft, to operate the latter independently of said first-named energy source.

JOSEPH W. ALLEN.